United States Patent [19]
Taylor et al.

[11] 4,076,332
[45] Feb. 28, 1978

[54] WHEEL LOCK CONTROL CIRCUIT

[75] Inventors: David W. Taylor, Davison; Philip R. Peterson, Grand Blanc, both of Mich.

[73] Assignee: General Motors Corporation, Detroit, Mich.

[21] Appl. No.: 761,896

[22] Filed: Jan. 24, 1977

[51] Int. Cl.² .............................................. B60T 8/08
[52] U.S. Cl. ...................................... 303/97; 303/107
[58] Field of Search .................... 303/91, 97, 105, 106, 303/107, 110, 111

[56] References Cited

U.S. PATENT DOCUMENTS

| | | | |
|---|---|---|---|
| 3,604,761 | 9/1971 | Okamoto | 303/97 |
| 3,709,567 | 1/1973 | Van Ostrom | 303/107 |
| 3,716,273 | 2/1973 | Beyerlein | 303/97 |
| 3,917,357 | 11/1975 | Stratta | 303/97 |

*Primary Examiner*—Trygve M. Blix
*Assistant Examiner*—Reinhard J. Eisenzopf
*Attorney, Agent, or Firm*—Howard N. Conkey

[57] ABSTRACT

A wheel lock control circuit includes a deceleration switch which effects release of the vehicle brake pressure when the deceleration of the vehicle wheels are greater than a reference deceleration. A portion of the reference deceleration is provided by an adaptive control circuit which is responsive to wheel deceleration to supply a signal representing an estimate of vehicle deceleration. An initial cycle circuit provides an initial high level portion of the reference deceleration to desensitize the system to noise signals and wheel transients. The initial cycle output of the initial cycle circuit is controlled by a portion of the adaptive control circuit which is responsive to wheel deceleration and which has a time constant greater than the deceleration switch so that the initial cycle circuit is effective to desensitize the wheel lock control circuit to system noise and vehicle transients independent of the deceleration switch response to the acceleration and reference signals.

2 Claims, 1 Drawing Figure

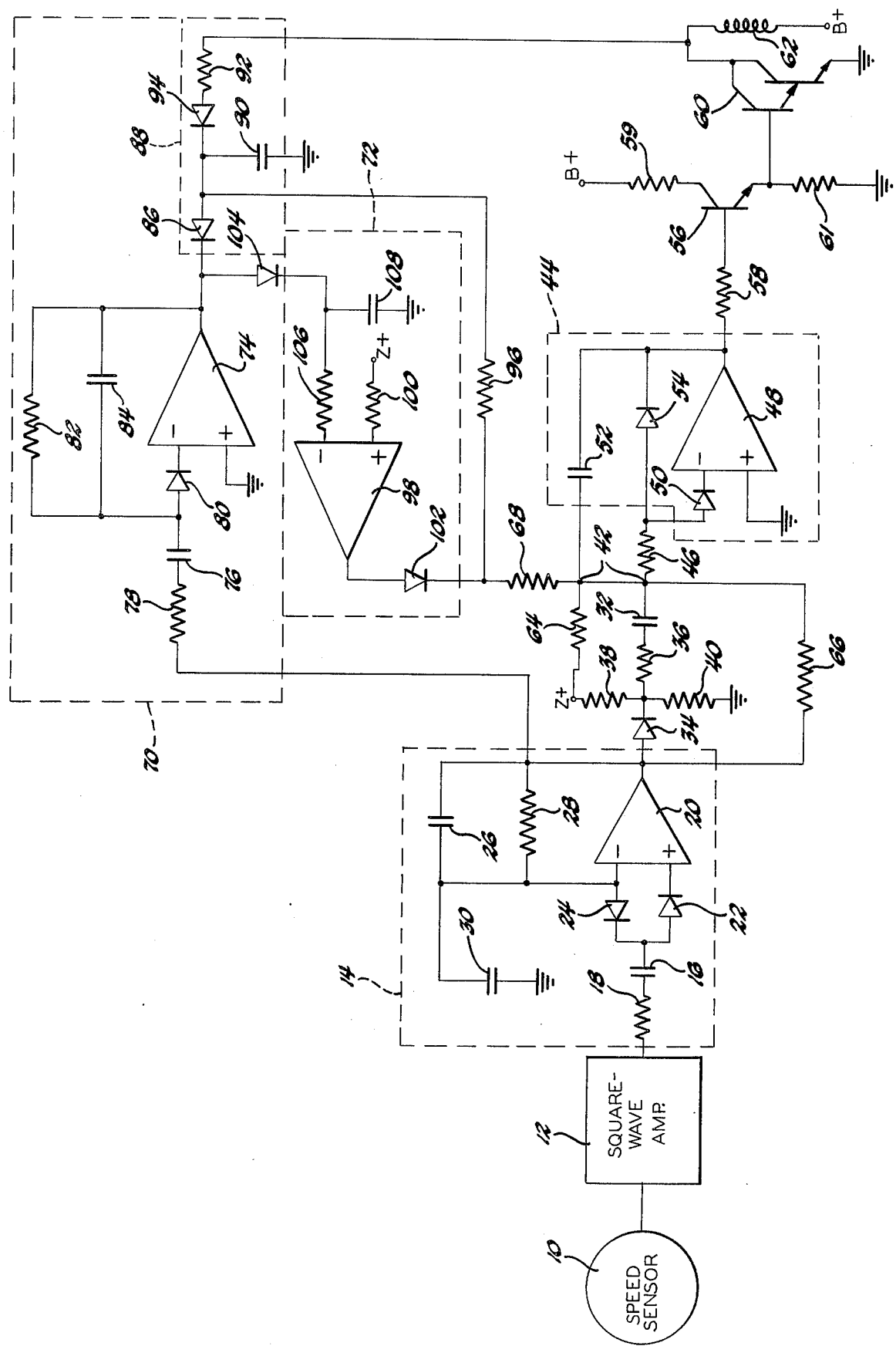

WHEEL LOCK CONTROL CIRCUIT

Wheel lock control systems which function to prevent the vehicle wheels from locking during braking are well known. Generally, these systems monitor the wheel speed, compare some function of the monitored wheel speed with a reference value which represents that the wheel is approaching a locked condition and release the brake pressure when the reference value is exceeded. The brake pressure is thereafter reapplied and the cycle is repeated as necessary to prevent wheel lock.

In order to desensitize the wheel lock control system to noise and wheel transients, many of the known wheel lock control systems incorporate an initial cycle circuit which supplies a high level reference with which the function of wheel speed is compared. In these systems, the intial cycle reference is terminated upon the first release of the wheel brake pressure so that the normal reference signal is then provided to be compared with the function of the wheel speed. Thereafter, the initial cycle is maintained low until the end of the wheel lock controlled braking period after which it is again initiated.

While these systems are effective to desensitize the wheel lock control system to the noise and wheel transient prior to the time of first brake pressure release, if the noise signals or the wheel transients are of such a magnitude that the system functions to release the wheel brake pressure even with the high initial cycle reference, the initial cycle reference is terminated at the release which renders the system even more susceptible to the noise that initially causes the brake pressure release.

It is the general object of this invention to provide an initial cycle reference in a wheel lock control system wherein the initial cycle is terminated by means independent from the portion of the system which provides for the release of the brake pressure.

It is another object of this invention to provide a wheel lock control system having an initial cycle circuit which sets a high level of wheel lock control reference with which a function of wheel speed is compared which is terminated by a filter circuit responsive to wheel deceleration.

It is another object of this invention to provide a wheel lock control circuit having an initial cycle circuit for providing an initial high reference value for wheel lock control and an adaptive control circuit for providing a variable reference representing an estimated vehicle speed which controls the initial cycle circuit to terminate the initial cycle reference independent of the release of the vehicle brake pressure.

The objects of this invention are accomplished by means of an initial cycle circuit which provides a normally high output with which wheel deceleration is compared and a filter circuit which functions to terminate the output of the initial cycle circuit as a function of wheel deceleration.

The invention may be best understood by reference to the following description of a preferred embodiment and the drawing which is a schematic diagram of a wheel lock control system incorporating the principles of this invention.

Referring to the drawing, a speed sensor 10 monitors the speed of a vehicle wheel and supplies an alternating signal having a frequency directly proportional to the wheel speed. The speed sensor 10 may take the form of any of the well known speed sensors such as a toothed wheel, variable reluctance, electromagnetic transducer. The output of the speed sensor 10 representing wheel speed is supplied to a square-wave amplifier 12 which supplies a series of square-wave pulses at the frequency of the output of the speed sensor 10.

The output of the square-wave amplifier 12 is coupled to a frequency-to-voltage converter 14, which provides a direct voltage output having a magnitude representing wheel speed. To provide this direct voltage speed signal, the output of the square-wave amplifier 12 is coupled to a differentiating capacitor 16 through a resistor 18. The resistor 18 and the capacitor 16 function to provide positive and negative current pulses to an amplifier 20 corresponding with the leading and trailing edges of the square-wave output of the square-wave amplifier 12. The positive current pulses are coupled to the positive input of the amplifier 20 through a diode 22 and the negative current pulses are coupled to the negative input of the amplifier 20 through a diode 24.

A feedback capacitor 26 and a feedback resistor 28 are each coupled between the output of the amplifier 20 and its negative input. Additionally, a capacitor 30 is coupled between the negative input of the amplifier 20 and ground.

The amplifier 20 and the remaining operational amplifiers in the circuit of the drawing are current amplifiers wherein the current input to the positive terminal is subtracted from the current input to the negative terminal and wherein a positive voltage output is provided when the current input to the positive terminal exceeds the current input to the negative terminal. Further, the operational amplifiers have a normally high output when no current is supplied to the input terminals.

The output of the amplifier 20 is a DC voltage signal having a magnitude which is directly related to the frequency of the square-wave signal output of the square-wave amplifier 12 and consequently the speed of the vehicle wheel as sensed by the speed sensor 10.

The speed signal output of the frequency-to-voltage converter 14 from the amplifier 20 is applied to the input of a differentiator, comprised of a capacitor 32, through a diode 34 and a resistor 36. A voltage divider comprised of a resistor 38 and a resistor 40 is coupled between a regulated power supply Z+ and ground with the junction formed between the resistors being coupled to the cathode of the diode 34. The resistors 38 and 40 establish a voltage at the cathode of the diode 34 which establishes a low speed cutoff below which the wheel lock control system is inoperative. The magnitudes of the resistors 36 and 40 are small so that the voltage at the cathode of the diode 34 tracks the output of the amplifier 20 during wheel deceleration.

The capacitor 32 differentiates the speed signal and supplies a current having a magnitude representing the acceleration or deceleration of the vehicle wheel. The output of the capacitor 32 representing acceleration or deceleration is coupled to a summing junction 42.

The current output of the capacitor 32 representing acceleration or deceleration is summed with a current at the summing junction 42 representing a reference wheel deceleration. The magnitude of the reference deceleration current represents a magnitude of wheel deceleration which, if exceeded, indicates an incipient wheel lock condition.

The output current of the summing junction 42, representing the summation of the wheel acceleration current and the deceleration reference current, is coupled to a deceleration switch 44 through a resistor 46.

The deceleration switch includes an amplifier 48 having its positive terminal grounded and having a negative input which receives the current through the resistor 46 through a diode 50. A feedback filter capacitor 52 is coupled between the output of the amplifier 48 and the summing junction 42. A diode 54 is coupled between the anode of the diode 50 and the output of the amplifier 48 to minimize the velocity change threshold introduced by the diode 50. The diode 50 functions to inhibit the amplifier 48 from sourcing current into the capacitor 32 during wheel deceleration to prevent the bleeding-off of the deceleration memory provided by the capacitor 32. The resistor 46 introduces a velocity change threshold, i.e., a required wheel velocity change after the deceleration reference is exceeded by actual wheel deceleration before the deceleration switch 44 is responsive to the wheel deceleration. When the actual wheel deceleration exceeds the reference deceleration (the negative current through the capacitor 32 exceeding the deceleration reference current supplied to the summing junction 42) and when the wheel speed thereafter decreases by the velocity change threshold provided by the resistor 46, the deceleration switch 44 shifts its output from ground potential to a positive voltage level.

The output of the deceleration switch 44 is coupled to the base of an NPN transistor 56 through a resistor 58. The collector of the transistor 56 is coupled to a voltage source B+, which may be the vehicle battery, through a resistor 59. The emitter of the transistor 56 is coupled to the base of an NPN Darlington transistor 60 and to ground through a resistor 61. The emitter of the Darlington transistor 60 is grounded and the collector thereof is coupled to the low voltage side of a conventional brake modulator solenoid winding 62, the other side of which is coupled to the voltage source B+.

When the magnitude of the wheel deceleration is less than the reference deceleration, the output of the deceleration switch 44 is at ground potential and the transistors 56 and 60 are biased nonconductive. Therefore, the solenoid winding 62 of the brake modulator is deenergized so that the brake pressure is applied to the vehicle brakes as determined by the vehicle operator. However, when the wheel deceleration exceeds the reference deceleration and the wheel speed thereafter decreases by the velocity change threshold, the deceleration switch 44 shifts its output to a positive voltage level to bias the transistors 56 and 60 conductive to energize the solenoid winding 62 of the brake modulator. The wheel brake pressure is then released to allow the wheel speed to recover.

During wheel lock control operation of the circuit of the drawing, the solenoid 62 is cyclically energized and deenergized as a function of the sensed wheel deceleration so that the brake pressure is cyclically relieved and reapplied to provide for optimum braking on the road surface without the wheels attaining a locked condition.

The reference deceleration current supplied to the summing junction 42 is comprised of the summation of a constant current supplied through a resistor 64 from the regulated voltage Z+, a varying current supplied through a resistor 66 from the frequency-to-voltage converter 14 and which has a magnitude directly proportional to the wheel velocity, and a portion supplied through a resistor 68. The magnitude of the portion of the deceleration reference current supplied through the resistor 68 is determined by either an adaptive control circuit 70 or an initial cycle circuit 72.

The function of the adaptive control circuit 70 is to provide a portion of the reference deceleration current which has a magnitude proportional to an estimated vehicle deceleration and which is related to the coefficient of friction of the road surface. With this current having a magnitude variable with the estimated vehicle deceleration, the wheel lock control circuit is made adaptive to varying coefficients of friction of the road surface.

The adaptive control circuit includes a first portion comprised of an amplifier 74 and its associated circuitry. The wheel speed signal from the frequency-to-voltage converter 14 is coupled to a differentiating capacitor 76 through a resistor 78. The resulting current supplied by the differentiating capacitor 76 has a magnitude proportional to wheel acceleration or deceleration. This current is coupled to the negative input of the amplifier 74 through a diode 80. The positive input of the amplifier 74 is grounded. A feedback resistor 82 and a feedback capacitor 84 is coupled between the output of the amplifier 74 and the anode of the diode 80.

The output of the amplifier 74 is normally maintained at ground potential as a result of the current feedback to its negative input through the resistor 82. However, when the wheel acceleration exceeds this current feedback value, and when the voltage at the anode of the diode 80 is reduced so that the current therethrough is reduced to zero, the amplifier 74 output begins to integrate upward as determined by the time constant of the circuit and by the magnitude of the wheel deceleration. Further, when the deceleration is greater than the current feedback through the resistor 82 and the capacitor 84, the voltage on the capacitor 76 at the anode of the diode 80 is lowered as a function of the integral of the difference between the actual wheel deceleration and the deceleration represented by the current feedback. Thereafter, when the wheel begins to accelerate the voltage potential on the capacitor 76 at the anode of the diode increases with increasing wheel speed. The amplifier 74 begins to integrate its output toward ground level when the diode again becomes forward biased.

During wheel lock control braking on a high coefficient of friction surface, the average wheel deceleration is greater than the deceleration represented by the reference current through the feedback elements of the amplifier 74. Consequently, the output of the amplifier 74 increases to a maximum positive output level during the first cycle of wheel lock control action and thereafter remains high throughout braking on the high coefficient of friction surface. However, when braking on a low coefficient of friction surfaces when the average current through the capacitor 76 is less than the current feedback through the feedback elements of the amplifier 74, current will be coupled up to the negative input of the amplifier 74 through the diode 80 during periods of wheel acceleration so that the output of the amplifier 74 decreases to ground potential. Thereafter, when the brake pressure is reapplied by the wheel lock control circuit, the amplifier 74 will again integrate its output positive as a function of the magnitude of wheel deceleration (after the velocity change threshold introduced by the diode 80 is exceeded). During wheel lock control braking on low coefficient of friction surfaces, the output of the amplifier 74 at the time of the wheel brake pressure release effected by the deceleration switch 44 has a magnitude which is representative of vehicle deceleration and which is related to the coefficient of friction of the road surfaces. After the brake pressure has been released, the output of the amplifier 74 increases to a maximum value even on low coefficient of friction surfaces as a result of the continued wheel deceleration which is inherent in the time lag of the brake system following the energization of the modulator solenoid winding 62. However, as indicated, the output of the amplifier 74 on low coefficient of friction surfaces attains a value at the time of wheel brake pressure release which is representative of the vehicle deceleration and the coefficient of friction of the road surface.

The output of the amplifier 74 is coupled to the cathode of a diode 86 in a track and hold circuit 88. The anode of the diode 86 is coupled to one side of a capacitor 90, the other side of which is grounded. The track and hold circuit 88 also includes a series circuit comprised of a resistor 92 and a diode 94 which couples the low voltage side of the solenoid winding 62 of the brake modulator to the ungrounded side of the capacitor 90. During periods of brake application when the solenoid winding 62 is deenergized, the track and hold circuit 88 functions to charge the capacitor to the level of the output of the amplifier 74. When the wheel deceleration exceeds the reference deceleration as determined by the current summation at the summing junction 42, the transistor 60 is biased into conduction, as previously indicated, to energize the solenoid winding 62. Conduction of the transistor 60 also grounds the anode of the diode 94 which prevents further charging of the capacitor 90. Therefore, at the time of brake release, the charge on the capacitor 90 is held to the level which it attained during the period just prior to the release of the vehicle brakes. The diode 86 prevents charging of the capacitor 90 from the output of the amplifier 74 after the solenoid winding 62 has been energized.

When the solenoid winding 62 is energized, the charge across the capacitor 90 is substantially equal to the output of the amplifier 74 at the point of brake release and therefore represents the magnitude of estimated vehicle deceleration. A resistor 96 is coupled between the capacitor 90 and the resistor 68 so that a current is supplied to the summing junction 42 which has a magnitude directly proportional to the magnitude of the voltage across the capacitor 90 and therefore the magnitude of estimated vehicle deceleration. In this manner and during normal wheel lock control operation, the reference deceleration current supplied to the summing junction 42 is varied as a function of the estimated vehicle deceleration and to provide for adaptive control of the wheel lock control system for varying road surface conditions.

During periods of vehicle brake application and when the wheel deceleration does not exceed the reference deceleration represented by the current supplied to the summing junction 42, system noise and wheel transients may yet produce a deceleration signal input to the summing junction 42 which may cause an erroneous release of the vehicle brakes even though an incipient wheel lock condition is not present.

In order to desensitize the wheel lock control system to these system noise signals and wheel transients, the initial cycle circuit 72 is provided which supplies a current to the summing junction 42 through the resistor 68 which sets the deceleration reference to a high value for the first cycle of wheel lock control operation. After the initial cycle of wheel lock control operation, the initial cycle reference is terminated and the reference deceleration is thereafter provided by the currents through the resistors 64 and 66 and the adaptive control current through the resistors 96 and 68.

The initial cycle circuit includes an amplifier 98 having its positive input coupled to the regulated voltage Z+ through a resistor 100. The output of the amplifier 98 is coupled to the summing junction 42 through a blocking diode 102 and the resistor 68. The positive current through the resistor 100 from the regulated voltage Z+ initially biases the amplifier 98 to a positive level so that the current supplied through the resistor 68 is at a high level to provide for the high initial cycle deceleration reference.

Initial cycle circuits in the past have been controlled by the output of the portion of the wheel lock control circuit which affects the wheel brake pressure release such as, for example, the deceleration switch 44. However, it can be seen that if a system noise signal or a wheel transient signal is of sufficient amplitude, the deceleration switch 44 may yet be operative to cause a wheel brake pressure release even though the wheel deceleration does not represent an incipient wheel lock condition. If this output were allowed to terminate the initial cycle, the system would be rendered even more sensitive to those system noise signals or wheel transient signals which caused the erroneous release. Therefore, this invention contemplates the termination of the initial cycle reference by a means other than the circuit portion which affects the wheel brake pressure release. Further, the invention contemplates terminating the initial cycle signal only when the wheel speed signal represents that the wheels are decelerating at a rate representing an incipient wheel lock condition.

To accomplish this aspect of the invention, the initial cycle circuit 74 is controlled by a portion of the adaptive control circuit 70 having an output signal with the characteristics required in order to accomplish proper termination of the initial cycle reference.

The amplifier 74 and its associated circuitry of the adaptive control circuit 70 has a time constant such that it effectively provides filtering of system noise and wheel transient deceleration signals so that the output thereof is generally insensitive to these signals. Further, the amplifier 74 and associated circuitry has a time constant sufficiently greater than the deceleration switch 44 so that its output does not increase to a high level prior to the deceleration switch 44 response to wheel deceleration signals. Therefore, this output is used to terminate the initial cycle by coupling the output of the amplifier 74 to the negative input of the amplifier 98 through a blocking diode 104 and a resistor 106. This voltage is also coupled across a capacitor 108.

When the current through the resistor 106 resulting from the output of the amplifier 74 increasing to a specified level exceeds the current through the resistor 100, the output of the amplifier 98 is terminated to remove the initial cycle current supplied thereby. At the same time, the capacitor 108 is charged by the output of the amplifier 74 and cooperates with the resistor 106 to maintain the initial cycle reference terminated until the end of the wheel lock control operation. In this respect, the capacitor 108 and the resistor 106 have a time constant such that the current through the resistor 106 is maintained greater than the current through the resistor 100 for a period at least greater than the longest cycle of operation of the wheel lock control system.

In operation, prior to the actuation of the vehicle brakes and during braking where the wheel deceleration is less than the reference deceleration represented by the current supplied to the junction 42, the output of the deceleration switch 44 is at ground potential so that the solenoid winding 62 of the brake modulator is deenergized. Also, the output of the amplifier 74 in the adaptive control circuit 70 is at ground potential to maintain the capacitor 90 discharged and the output of the amplifier 98 in the initial cycle circuit 72 is at the high voltage level so that the deceleration reference supplied to the summing junction 42 is at the high level in order to desensitize the wheel lock control system to system noise and wheel transient signals. If the system noise and wheel transient signals are of a sufficient magnitude so that deceleration switch 44 is responsive thereto to energize the solenoid winding 62, the system remains in a desensitized state with respect to those system noise and wheel transient signals as a result of the filtering action provided by the amplifier 74 and associated circuitry in the adaptive control circuit 70. When the vehicle wheel decelerates during vehicle braking by an amount which exceeds the high level reference deceleration provided by the reference deceleration current supplied to the summing junction 42, the deceleration switch 44 is responsive to energize the solenoid winding 62 to effect wheel release of the wheel brake pressure. After a time period determined by the time constant of the amplifier 74 and associated circuitry, the current supplied to the negative input of the amplifier 98 increases to above the reference current supplied to the resistor 100 so as to effect termination of the initial cycle signal so that the system thereafter is operative in the normal manner to provide for wheel lock control.

The detailed description of the preferred embodiment of this invention for the purposes of explaining the principles thereof is not to be considered as limiting or restricting the invention since many modifications may be made by the exercise of skill in the art without departing from the scope of the invention.

What is claimed is:

1. A wheel lock control system for a vehicle with braked wheels and characterized by its insensitivity to system noise and vehicle and wheel transients comprising:

means effective to provide an acceleration signal which is a function of wheel deceleration and wheel acceleration;

means effective to provide a two-component reference signal, one component being independent of initial cycle and representing a reference wheel deceleration and the other component being determined by an initial cycle circuit effective to generate an artificial initial cycle signal having a predetermined magnitude representing a high level of wheel deceleration;

brake control means responsive to the acceleration and reference signals effective to cyclically relieve and apply wheel brake pressure when the acceleration and reference signals attain predetermined relationships; and circuit means responsive to the acceleration signal effective to provide an initial cycle control signal that is an integral function of wheel deceleration so as to provide filtering of system noise and wheel transients reflected in the acceleration signal, the initial cycle circuit terminating the initial cycle signal when the initial cycle control signal attains a predetermined level in response to wheel deceleration, the initial cycle circuit being effective to establish a high level of reference deceleration which must be exceeded to release the wheel brake pressure to desensitize the brake control means response to system noise and vehicle wheel transients independent of the brake control means response to the acceleration and reference signal until the initial cycle control signal attains the predetermined level.

2. A wheel lock control system for a vehicle with braked wheels and characterized by its insensitivity to system noise and vehicle and wheel transients comprising:

means effective to provide an acceleration signal which is a function of wheel acceleration and deceleration;

means effective to provide a two-component reference signal, one component being independent of the initial cycle of wheel lock control operation and representing a reference wheel deceleration and the other component being determined by an initial cycle circuit effective to generate an artificial initial cycle signal having a predetermined magnitude representing a high level of vehicle deceleration; and brake control means responsive to the acceleration and reference signals effective to cyclically relieve and apply wheel brake pressure when the acceleration and reference signals attain predetermined relationships, the means effective to provide the two-component reference signal including circuit means effective to provide a control signal having a magnitude representing vehicle deceleration at the point in time the acceleration signal represents a wheel deceleration equal to the first mentioned component of the reference signal, means responsive to the control signal effective to provide a portion of the first mentioned component of the reference signal that is proportional to an estimated vehicle deceleration, and means responsive to the control signal effective to terminate the initial cycle signal when the control signal attains a predetermined level, the initial cycle circuit being effective to establish a high level of reference deceleration which must be exceeded to provide for release of the wheel brake pressure so as to desensitize the brake control means response to system noise and vehicle and wheel transients independent of the brake control means response to the acceleration and reference signals until the initial cycle signal is terminated by the control signal.

* * * * *